United States Patent
Nakagawa

(10) Patent No.: US 10,523,862 B2
(45) Date of Patent: Dec. 31, 2019

(54) ELECTRONIC DEVICE, METHOD, AND MEDIUM FOR TOUCH MOVEMENT CONTROL

(71) Applicant: CANON KABUSHIKI KAISHA, Tokyo (JP)

(72) Inventor: Koichi Nakagawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/360,532

(22) Filed: Nov. 23, 2016

(65) Prior Publication Data

US 2017/0155826 A1  Jun. 1, 2017

(30) Foreign Application Priority Data

Nov. 30, 2015 (JP) ................................. 2015-234300

(51) Int. Cl.
*H04N 5/232* (2006.01)

(52) U.S. Cl.
CPC ..... *H04N 5/23216* (2013.01); *H04N 5/23212* (2013.01); *H04N 5/23293* (2013.01)

(58) Field of Classification Search
CPC ........... H04N 5/23216; H04N 5/23293; H04N 5/23212

See application file for complete search history.

(56) References Cited

U.S. PATENT DOCUMENTS

| | | | | |
|---|---|---|---|---|
| 2009/0262211 A1* | 10/2009 | Mori | ...................... | G06F 3/0412 348/222.1 |
| 2013/0271416 A1* | 10/2013 | Liu | ........................ | G06F 3/0488 345/173 |
| 2016/0357392 A1* | 12/2016 | Hyun | ................... | G06F 3/04842 |
| 2016/0360116 A1* | 12/2016 | Penha | .................... | G06F 3/0487 |

FOREIGN PATENT DOCUMENTS

| | | |
|---|---|---|
| CN | 102339151 A | 2/2012 |
| CN | 102566858 A | 7/2012 |
| CN | 103513886 A | 1/2014 |
| CN | 103513924 A | 1/2014 |
| CN | 103582860 A | 2/2014 |
| CN | 104252264 A | 12/2014 |
| JP | 2011-160275 A | 8/2011 |
| JP | 2012-203143 A | 10/2012 |
| JP | 2012-248068 A | 12/2012 |
| JP | 2014-010494 A | 1/2014 |
| WO | 2012/075916 A1 | 6/2012 |

* cited by examiner

*Primary Examiner* — Mekonnen D Dagnew
(74) *Attorney, Agent, or Firm* — Canon USA, Inc., IP Division

(57) ABSTRACT

An electronic device includes a touch detection unit detecting a touch operation on a touch surface, a selection unit selecting a position on a display unit according to a touch movement, and a control unit performing control so that a specific process based on a selected position is performed, where when, subsequent to a first movement, a touch is released from a predetermined region of the touch surface, the specific process based on a position selected according to the first movement is not performed.

15 Claims, 8 Drawing Sheets

ELECTRONIC DEVICE, METHOD, AND MEDIUM FOR TOUCH MOVEMENT CONTROL

BACKGROUND

Field

The present disclosure generally relates to an electronic device and a method for controlling the same, and in particular, relates to a technique for setting, using a touch panel, a position where a specific process is performed.

Description of the Related Art

In recent years, there is a case where a user changes or sets a selected position by performing an operation on a touch panel. A method has been proposed in which a user operates a touch panel on the back side of an imaging apparatus while looking into a display unit in a viewfinder, thereby specifying an autofocus (AF) position. According to the technique discussed in Japanese Patent Application Laid-Open No. 2012-203143, in a case where a user performs an operation on a back side monitor while looking into a display unit in a viewfinder, the user can change an AF position according to the movement of a touch position on the back side monitor. Japanese Patent Application Laid-Open No. 2012-203143 also discusses that the AF position is initialized by a sliding out of a touch from the back side monitor.

When a user performs a touch operation on a touch panel on the back side of an imaging apparatus while looking into a viewfinder, the user can have difficulty confirming the state of the touch on the touch panel. In other words, it is highly likely that the user cannot precisely know which position on the touch panel the user is touching in the state where the user is looking into the viewfinder. Thus, in the method discussed in Japanese Patent Application Laid-Open No. 2012-203143, in a case where the user moves the AF position to change the AF position but the user does not know the touch position on the touch panel and thus the touch position comes out of a touch region without the user's intention, there is a possibility that the AF position that is being set is set at an unintended position. As described above, in a case where a user changes or sets a position, and if a touch slides out of a touch panel without the user's intention, there is a possibility that a specific process is performed at an unintended position.

SUMMARY

The present disclosure is directed to describing an electronic device that reduces the possibility that a specific process is performed at an unintended position while a user is moving a specified position regarding a specific process to be performed based on the specified position.

According to aspects of the embodiments, an electronic device includes a touch detection unit configured to detect a touch operation on a touch detection surface, a selection unit configured to select a position on a display unit according to a movement operation that is an operation of moving a touch position of the detected touch operation, and a control unit configured to perform control so that a specific process based on the selected position is performed, wherein the control unit performs control so that: in a case where, subsequent to a first movement operation, a touch is released from, on the touch detection surface, a predetermined region including an end region of the touch detection surface, the specific process based on a position selected according to the first movement operation is not performed, and according to a second movement operation being performed, a position to be selected is moved from the position that is selected according to the first movement operation on the display unit; and in a case where, subsequent to the first movement operation, a touch is released from, on the touch detection surface, a region that is not the predetermined region, the specific process based on the position selected according to the first movement operation is performed.

Further features will become apparent from the following description of exemplary embodiments with reference to the attached drawings.

DESCRIPTION OF THE EMBODIMENTS

An exemplary embodiment will be described in detail below with reference to the accompanying drawings. It is to be noted that the following exemplary embodiment is merely an example and can be appropriately modified or changed depending on individual constructions and various conditions of apparatuses to which the present disclosure is applied. Thus, the following exemplary embodiment is not seen to be limiting.

Figure 1A:
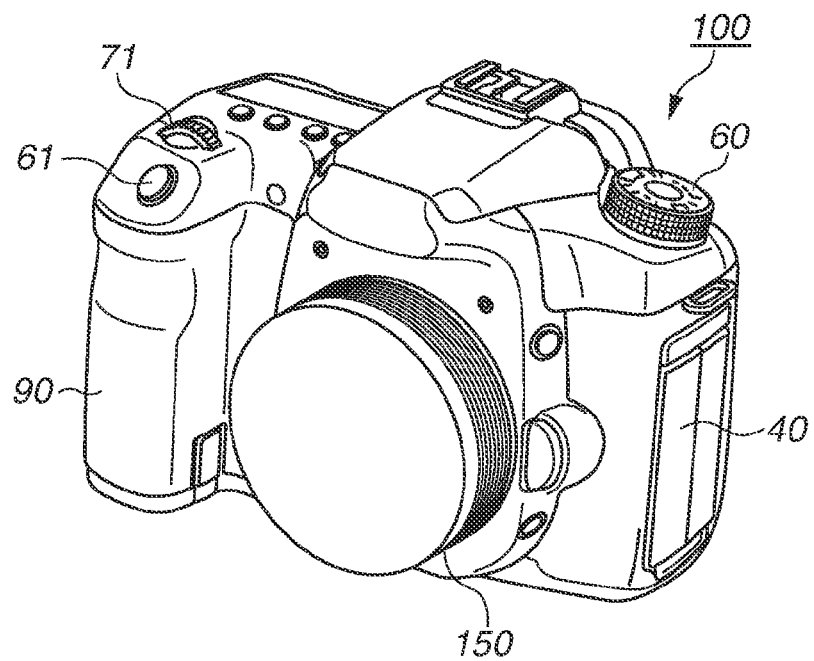
FIGS. 1A and 1B are diagrams illustrating external views of a digital camera as an example of an apparatus to which an exemplary embodiment is applicable.
Figure 1B:
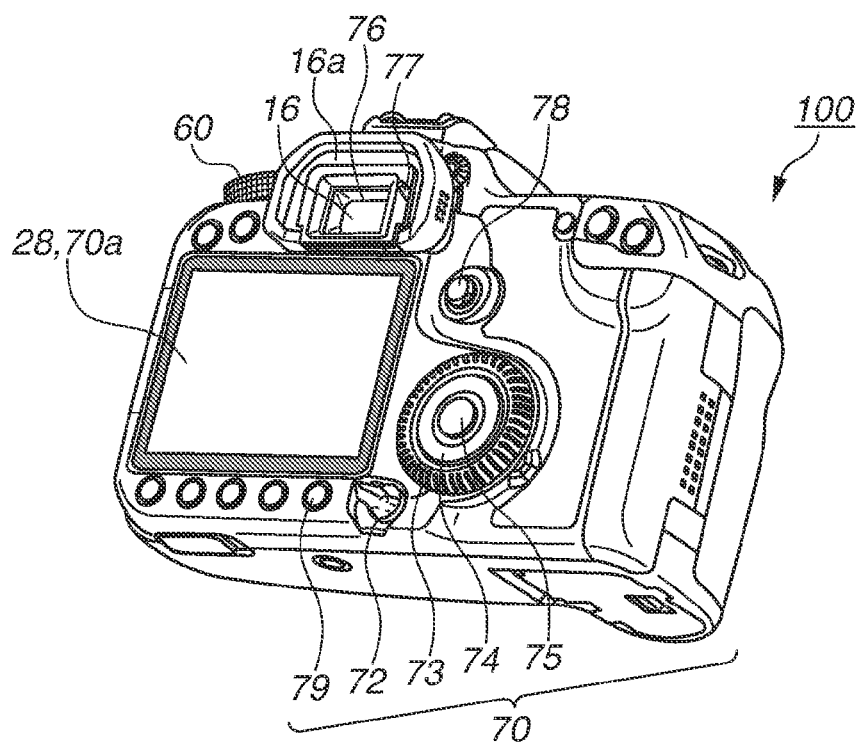

FIGS. 1A and 1B are diagrams illustrating external views of a digital camera as an example of an imaging control apparatus to which the present exemplary embodiment is applicable. FIG. 1A is a diagram illustrating a front perspective view of a digital camera 100. FIG. 1B is a diagram illustrating a rear perspective view of the digital camera 100. A display unit 28 is a display unit for displaying an image and various pieces of information. On the display unit 28, a touch panel 70a, which can receive a touch operation, i.e., detect a touch, is provided in an overlapping manner. A shutter button 61 is an operation unit for giving an image capturing instruction. A mode selection switch 60 is an operation unit for switching various modes. A terminal cover 40 is a cover for protecting a connector (not illustrated), such as a connection cable, for connecting an external device and the digital camera 100.

A main electronic dial 71 is a rotary operation member included in an operation unit 70. By rotating the main electronic dial 71, it is possible to change the setting value of a shutter speed or a stop. A power switch 72 is an operation member for switching the turning on and off of the digital camera 100. A sub electronic dial 73 is a rotary operation member included in the operation unit 70 and enables the movement of a selection frame or image advancement. A directional pad 74 is a directional pad (a four-direction key) which is included in the operation unit 70 and of which upper, lower, left, and right portions can each be pushed in. The directional pad 74 enables an operation according to a pushed portion of the directional pad 74.

A SET button 75 is a push button included in the operation unit 70 and is mainly used to determine a selection item. A live view (LV) button 78 is a button included in the operation unit 70. In a still image capturing mode, the LV button 78 is used to switch the on state and the off state of LV display on the display unit 28. In a moving image capturing mode, the LV button 78 is used to give an instruction to start or stop capturing (recording) a moving image.

A reproduction button 79 is an operation button included in the operation unit 70 and used to switch an image capturing mode and a reproduction mode. The reproduction button 79 is pressed in the image capturing mode, whereby the image capturing mode transitions to the reproduction mode, and the most recent image among images recorded in a recording medium 200 can be displayed on the display unit 28. A grip portion 90 is a holding portion for performing an operation while holding the digital camera 100. The operation unit 70 is provided on the grip portion 90 side. A lens unit 150 is a lens portion attachable to and detachable from the digital camera 100.

A user looks into a viewfinder 16 and thereby can view (visually confirm) a subject through an optical viewfinder (OVF). An eye approach sensor 77 is a physical body detection (eye approach detection) unit for detecting that a physical body is approaching a distance smaller than a predetermined distance (within the predetermined distance), such as 1 centimeter or 2 centimeters, from the physical body detection unit. For example, if the user brings the user's eye close to the viewfinder 16 (looks into an eyepiece portion 16a) to view an in-viewfinder display unit 76, and the eye approach sensor 77 detects the approach of a physical body (the eye), the display on the in-viewfinder display unit 76 can be viewed on the subject viewable through the OVF in a superimposed manner.

If detecting that the physical body (the eye) separates the predetermined distance or more from the eye approach sensor 77, the eye approach sensor 77 hides the display of an item from the in-viewfinder display unit 76. If the user looks into the viewfinder 16, the display on the display unit 28 is hidden, but the touch panel 70a can receive a touch operation on the touch panel 70a for setting an AF position. At this time, if the user performs a touch operation on the touch panel 70a in the state where the user holds the grip portion 90 and placing the user's finger on the shutter button 61, the user can quickly perform the operation of moving the AF position and give an image capturing instruction while viewing the display on the in-viewfinder display unit 76 (and the subject viewable through the OVF). The display on the viewfinder 16, however, can be performed using an electronic viewfinder (EVF) instead of the OVF.

Figure 2:
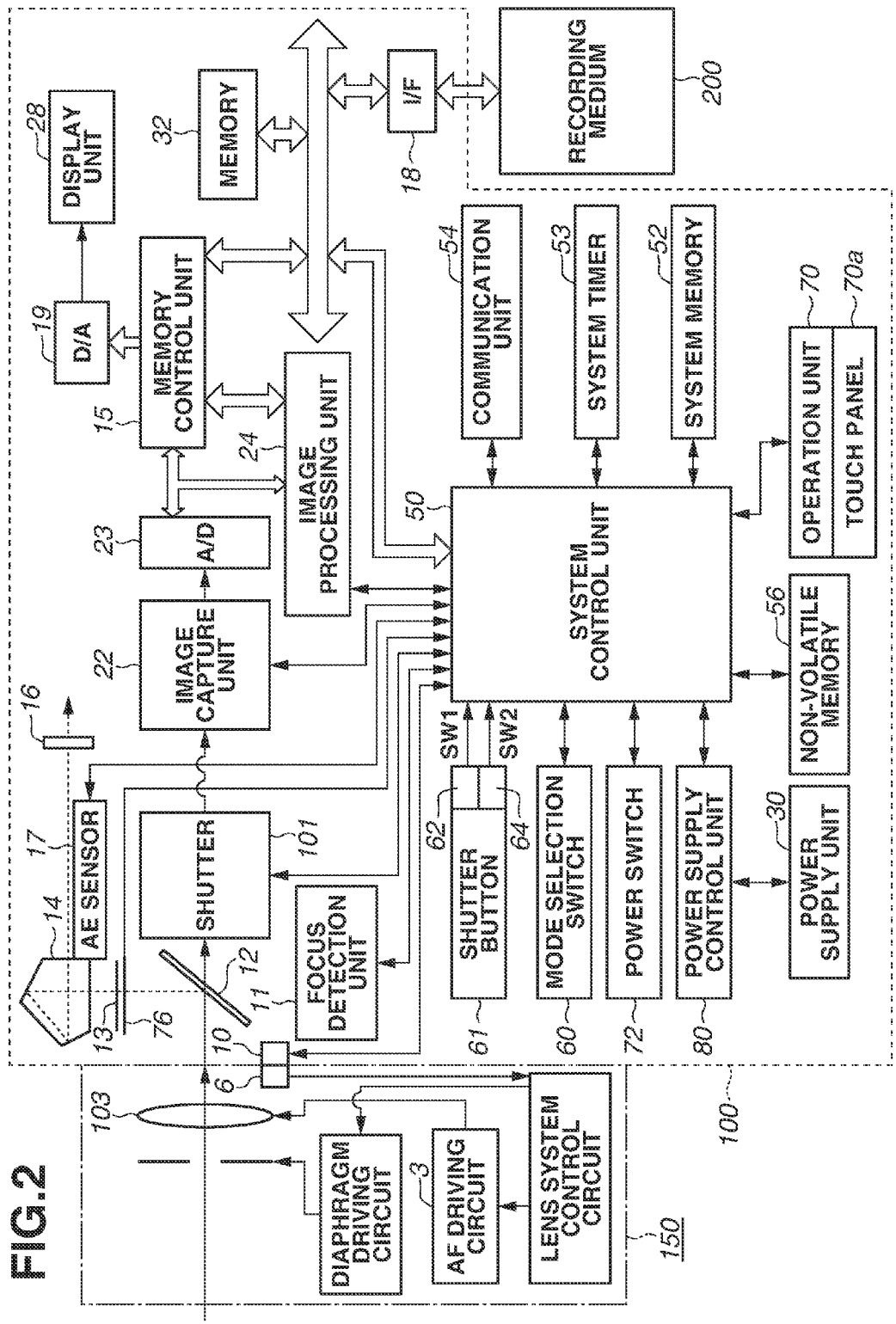
FIG. 2 is a block diagram illustrating an example of a configuration of the digital camera as the example of the apparatus to which the exemplary embodiment is applicable.

FIG. 2 is a block diagram illustrating an example of the configuration of the digital camera 100 according to the present exemplary embodiment.

In FIG. 2, the lens unit 150 is a lens unit in which an interchangeable photographing lens is provided. Although a lens 103 normally includes a plurality of lenses, FIG. 2 illustrates only a single lens in a simplified manner. A communication terminal 6 is a communication terminal for the lens unit 150 to communicate with the digital camera 100 side. A communication terminal 10 is a communication terminal for the digital camera 100 to communicate with the lens unit 150 side. An automatic exposure (AE) sensor 17 photometrically measures, via the lens unit 150 and an quick-return mirror 12, the luminance of an image of a subject formed on a focusing screen 13.

The quick-return mirror 12 (hereinafter, referred to as the "mirror 12") is moved up and down by an actuator (not illustrated) according to an instruction from a system control unit 50 when exposure is performed, or LV image capturing is performed, or a moving image is photographed. The mirror 12 is a mirror for switching a light beam incident from the lens 103 to the viewfinder 16 side and an image capture unit 22 side. The mirror 12 is disposed to normally reflect a light beam to guide the light beam to the viewfinder 16. However, in a case where an image is photographed, or in a case where LV display is performed, the mirror 12 flips up and retracts from a light beam to guide the light beam to the image capture unit 22 (mirror-up). The mirror 12 is a one-way mirror so that a center portion of the mirror 12 can allow a part of light to pass therethrough. The mirror 12 allows a part of a light beam to pass through the center portion of the mirror 12 to become incident on a focus detection unit 11 for detecting a focus.

A photographer observes, through a pentaprism 14 and the viewfinder 16, an image combined on the focusing screen 13 and thereby can confirm the focus state or the composition of an optical image of a subject obtained through the lens unit 150.

The in-viewfinder display unit 76 is a display unit placed on an optical path from the lens 103 to the viewfinder 16. On the in-viewfinder display unit 76, a frame indicating a current AF position or an icon (an item, a mark, or a sign) indicating the setting state of the camera is displayed via the system control unit 50. The focusing screen 13 and the in-viewfinder display unit 76 are located at positions close to each other and placed on top of each other so that the user can confirm the display on each of the focusing screen 13 and the in-viewfinder display unit 76 at a time. The focus detection unit 11 (an AF sensor) is a phase difference detection AF sensor for outputting amount-of-defocus information from a captured image to the system control unit 50. The system control unit 50 can control the lens unit 150 via the communication terminals 6 and 10. The system control unit 50 performs phase difference AF via an AF driving circuit 3 based on amount-of-defocus information and performs phase difference AF by displacing the position of the lens 103 (can execute AF). The method of AF can be contrast AF instead of phase difference AF.

The image capture unit 22 is an image sensor including a charge-coupled device (CCD) or a complementary metal-oxide-semiconductor (CMOS) device, which converts an optical image into an electric signal. An analog-to-digital (A/D) converter 23 converts an analog signal into a digital signal. The A/D converter 23 is used to convert an analog signal output from the image capture unit 22 into a digital signal.

An image processing unit 24 performs a resizing process, such as predetermined pixel interpolation and reduction, and a color conversion process on data from the A/D converter 23 or data from a memory control unit 15. The image processing unit 24 performs a predetermined calculation process using captured image data. Then, the system control unit 50 performs exposure control and distance measurement control based on the obtained calculation result. Consequently, an Auto Focus (AF) process, an Auto Exposure (AE) process, and a pre-flash (EF) process are performed by a through-the-lens (TTL) method. The image processing unit 24 also performs a predetermined calculation process using captured image data and performs an auto white balance (AWB) process by the TTL method based on the obtained calculation result.

The display unit 28 is a back side monitor for displaying an image. The display unit 28 can be a display using a liquid crystal method as well as a display using another method, such as an organic electroluminescence (EL) display, so long as the display displays an image.

Output data from the A/D converter 23 is written directly to a memory 32 via the image processing unit 24 and the memory control unit 15 or via the memory control unit 15. The memory 32 stores image data obtained by the image capture unit 22 and converted into digital data by the A/D converter 23 and image data to be displayed on the display unit 28. The memory 32 includes a sufficient storage capacity for storing a predetermined number of still images and a moving image and a sound of a predetermined length of time. The memory 32 doubles as a memory for image display (a video memory). A digital-to-analog (D/A) converter 19 converts data for image display stored in the memory 32 into an analog signal and supplies the analog signal to the display unit 28 or the in-viewfinder display unit 76. Consequently, image data for display written in the memory 32 is displayed on the display unit 28 or the in-viewfinder display unit 76 via the D/A converter 19. The display unit 28 or the in-viewfinder display unit 76 performs display on a display device such as a liquid crystal display (LCD) according to an analog signal from the D/A converter 19. Analog signals are once converted into digital signals by the A/D converter 23, and the digital signals are accumulated in the memory 32 and converted into analog signals by the D/A converter 19. The analog signals are sequentially transferred to and displayed on the display unit 28, whereby the display unit 28 functions as an electronic viewfinder (EVF) and can perform through image display (LV display) (in a case where the display in the viewfinder 16 is performed using an EVF).

A non-volatile memory 56 is an electrically erasable and recordable memory and is, for example, an Electrically Erasable Programmable Read-Only Memory (EEPROM). The non-volatile memory 56 stores a constant for the operation of the system control unit 50 and a program. The "program" refers to a program for executing the processing of various flow charts described below in the present exemplary embodiment.

The system control unit 50 controls the entirety of the digital camera 100. The system control unit 50 executes the above program stored in the non-volatile memory 56, thereby achieving processes described below in the present exemplary embodiment. Into a system memory 52, a constant or a variable for the operation of the system control unit 50 and the program read from the non-volatile memory 56 are loaded. As the system memory 52, a random-access memory (RAM) is used. The system control unit 50 controls the memory 32, the D/A converter 19, the display unit 28, and the in-viewfinder display unit 76, thereby also performing display control.

A system timer 53 is a time measurement unit for measuring the time used for various types of control and the time of a built-in clock.

The mode selection switch 60, the shutter button 61, and the operation unit 70 are operation means for inputting various operation instructions to the system control unit 50.

The mode selection switch 60 switches the operation mode of the system control unit 50 to either one of an image capturing mode and a reproduction mode. There are various scene modes in which image capturing settings are made according to image capturing scenes, a program AE mode, and a custom mode. The mode selection switch 60 directly switches the operation mode to any one of these modes included in a menu screen. Alternatively, after display is once switched to the menu screen, the operation mode can be switched to any one of these modes included in the menu screen, using another operation member.

A first shutter switch 62 is turned on in an intermediate state of the operation, i.e., by a so-called half press (an image capturing preparation instruction), of the shutter button 61 provided in the digital camera 100 and generates a first shutter switch signal SW1. Based on the first shutter switch signal SW1, the system control unit 50 starts the operation of an AF process, an AE process, an AWB process, or an EF process.

A second shutter switch 64 is turned on by the completion of the operation, i.e., by a so-called full press (an image capturing instruction), of the shutter button 61 and generates a second shutter switch signal SW2. Based on the second shutter switch signal SW2, the system control unit 50 starts a series of operations of an image capturing process from the reading of a signal from the image capture unit 22 to the writing of image data to the recording medium 200.

The operation members of the operation unit 70 are appropriately assigned functions for corresponding scenes by performing the operation of selecting various function icons displayed on the display unit 28 and act as various function buttons. The operation unit 70 includes at least operation members such as the shutter button 61, the main electronic dial 71, the power switch 72, the sub electronic dial 73, the directional pad 74, the SET button 75, the LV button 78, and the reproduction button 79. The user can intuitively make various settings using the menu screen displayed on the display unit 28, the four-direction button for up, down, left, and right directions, and the SET button.

A power supply control unit 80 includes a battery detection circuit, a direct-current-to-direct-current (DC/DC) converter, and a switch circuit for switching blocks to which to apply a current. The power supply control unit 80 detects the presence or absence of attachment of a battery, the type of a battery, and the remaining life of a battery. The power supply control unit 80 controls the DC/DC converter based on these detection results and an instruction from the system control unit 50 and supplies a required voltage to the components including the recording medium 200 for a required period of time.

A power supply unit 30 includes a primary battery such as an alkaline battery or a lithium battery, a secondary battery such as a nickel-cadmium (NiCd) battery, a nickel-metal hydrate (NiMH) battery, or a lithium-ion (Li) battery, or an alternating current (AC) adapter. A recording medium interface (I/F) 18 is an interface with the recording medium 200 such as a memory card or a hard disk. The recording medium 200 is a recording medium, such as a memory card, for recording a photographed image and includes a semiconductor memory or a magnetic disk.

A communication unit 54 establishes a connection wirelessly or via a cable for a wired connection, and transmits and receives an image signal or a sound signal. The communication unit 54 can also connect to a wireless local area network (LAN) or the Internet. The communication unit 54 can transmit an image (including a through image) captured by the image capture unit 22 or an image recorded in the recording medium 200. The communication unit 54 can receive image data or various other pieces of information from an external device.

The operation unit 70 includes as one of the operation members the touch panel 70a, which can detect contact with the display unit 28. The touch panel 70a and the display unit 28 can be formed in an integrated manner. For example, the touch panel 70a is configured so that the transmittance of light does not hinder the display of the display unit 28. Then, the touch panel 70a is attached to an upper layer of the display surface of the display unit 28. Then, input coordinates on the touch panel 70a are associated with display coordinates on the display unit 28. Consequently, it is possible to configure a graphical user interface (GUI) as if the user can directly operate a screen displayed on the display unit 28. A setting for receiving an instruction by thus associating the position where a touch operation is performed with the position on the display unit 28 is referred to as an "absolute coordinate setting".

Unlike the absolute coordinate setting, a setting for receiving an instruction not at touch coordinates but at the position to which a touch moves from a predetermined position on the display unit 28 according to the amount of movement and the moving direction of a touch operation (the position to which a touch moves by an amount according to a movement operation) is referred to as a "relative coordinate setting".

In a case where the user performs an operation while viewing the in-viewfinder display unit 76, and if the user performs a touch operation according to the absolute coordinate setting, the user touches the touch panel 70a (the display unit 28) without viewing the touch panel 70a (the display unit 28). Thus, it is highly likely that the user erroneously performs the touch operation at a position shifted from a desired position. If, on the other hand, the user performs a touch operation according to the relative coordinate setting, the user gives a movement instruction based not on the position of the touch operation but on the amount of movement of the touch operation. Thus, the user performs the operation of moving the touch to a desired position while viewing the position of an operation target displayed on the in-viewfinder display unit 76 and thereby can give an instruction at a desired position. The absolute coordinate setting and the relative coordinate setting can be set in touch pad settings on the menu screen. In the case of the relative coordinate setting, if the user performs an operation in the state of viewing the display unit 28, there is a possibility that a touch position and an instruction position are shifted from each other, thereby reducing the operability. Thus, when the eye approach sensor 77 detects the approach of a physical body, and if a touch operation according to relative coordinates is received, the operability is high both in a case where the user is viewing the display unit 28 and a case where the user is viewing the in-viewfinder display unit 76. The function in which the touch panel 70a receives a touch operation while an image is not displayed on the display unit 28 is referred to as a "touch pad function".

The system control unit 50 can detect the following operations on the touch panel 70a or the following states.

The state where a finger or a pen that has not touched the touch panel 70a newly touches the touch panel 70a, i.e., the start of a touch (hereinafter referred to as a "touch-down").

The state where the finger or the pen touches the touch panel 70a (hereinafter referred to as a "touch-on").

The state of moving the finger or the pen while the finger or the pen keeps touching the touch panel 70a (hereinafter referred to as a "touch move").

The state of releasing from the touch panel 70a the finger or the pen having touched the touch panel 70a, i.e., the end of a touch (hereinafter referred to as a "touch-up").

The state where nothing touches the touch panel 70a (hereinafter referred to as a "touch-off").

If a touch-down is detected, simultaneously, a touch-on is detected. After the touch-down, normally, the touch-on continues to be detected unless a touch-up is detected. A touch move is detected also in the state where a touch-on is detected. Even if a touch-on is detected, but if the touch position does not move, a touch move is not detected. After a touch-up of all the fingers or the pen having touched the touch panel 70a is detected, a touch-off is detected.

The system control unit 50 is notified via an internal bus of these operations and states and the position coordinates where the finger or the pen touches the touch panel 70a. Based on the information of which the system control unit 50 is notified, the system control unit determines what operation is performed on the touch panel 70a. In the case of a touch move, the system control unit 50 can also determine, based on changes in the position coordinates, the moving direction of the finger or the pen moving on the touch panel 70a with respect to each of the vertical and horizontal components on the touch panel 70a. A series of operations of, after a touch-on is detected, quickly performing a touch-up without performing a touch move is referred to as a "tap". If the user continuously performs a touch-down, a certain touch move, and a touch-up on the touch panel 70a, the user is regarded as drawing a stroke. The operation of quickly drawing a stroke is referred to as a "flick". A flick is the operation of quickly moving the finger by some distance while the finger keeps touching the touch panel 70a, and then releasing the finger from the touch panel 70a immediately after the quick movement. In other words, a flick is the operation of quickly tracing the touch panel 70a with the finger in a flipping manner. If a touch move performed by a predetermined distance or more at a predetermined speed or more is detected, and a touch-up is detected immediately after the touch move, the system control unit 50 can determine that a flick is performed. If a touch move performed by a predetermined distance or more at less than a predetermined speed is detected, the system control unit 50 determines that a drag is performed. The touch panel 70a can be a touch panel of any of various types such as a resistive type, an electrostatic capacitance type, a surface acoustic wave type, an infrared type, an electromagnetic induction type, an image recognition type, and a photosensor type. Although a method for detecting the presence of a touch according to the presence of the contact of the finger or the pen with the touch panel 70a, or a method for detecting the presence of a touch according to the presence of the approach of the finger or the pen to the touch panel 70a is employed depending on the type, either of the methods can be used.

Figure 3A:
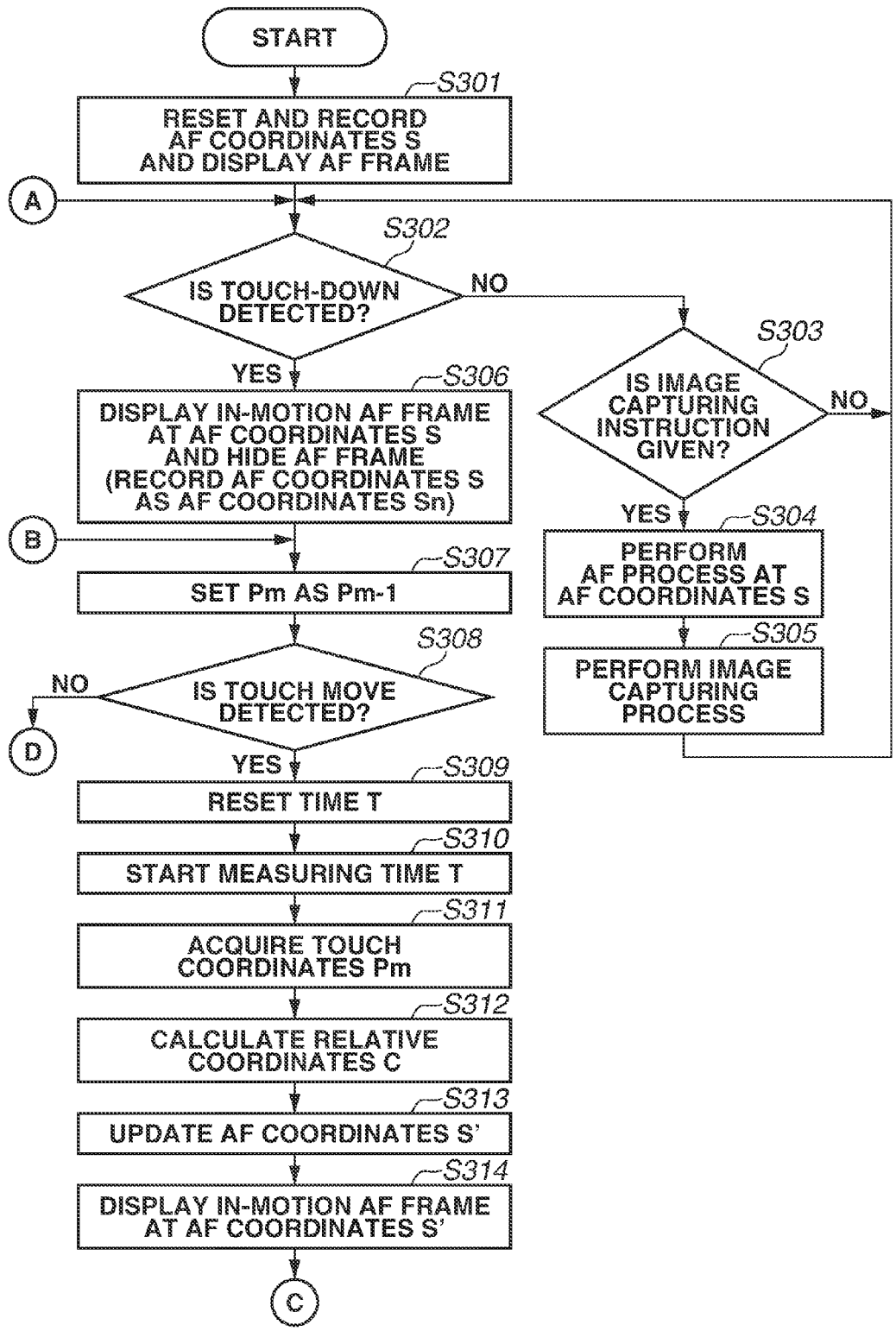
FIGS. 3A, 3B, and 3C constitute a flowchart illustrating an AF position movement processing according to the exemplary embodiment.
Figure 3B:
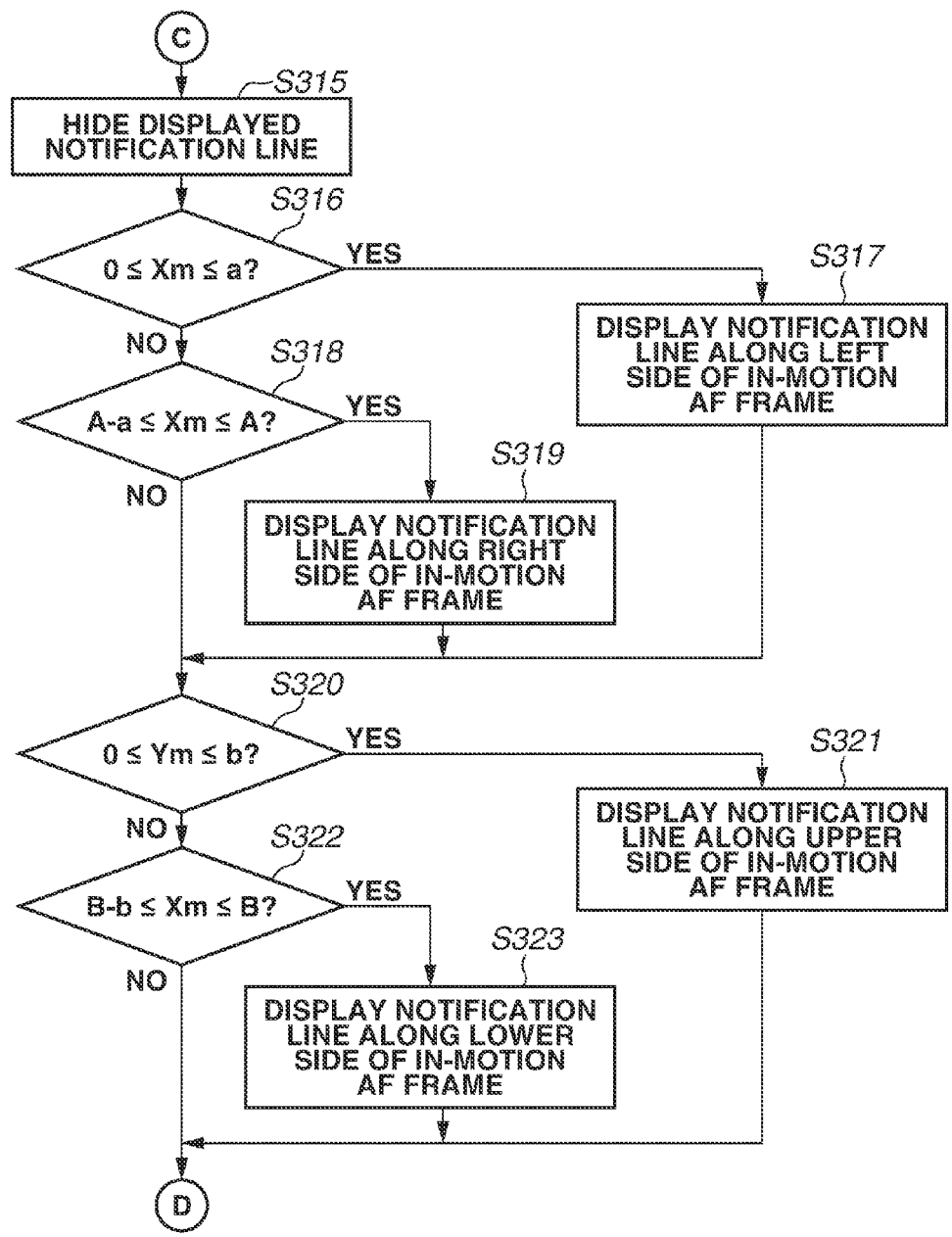
Figure 3C:
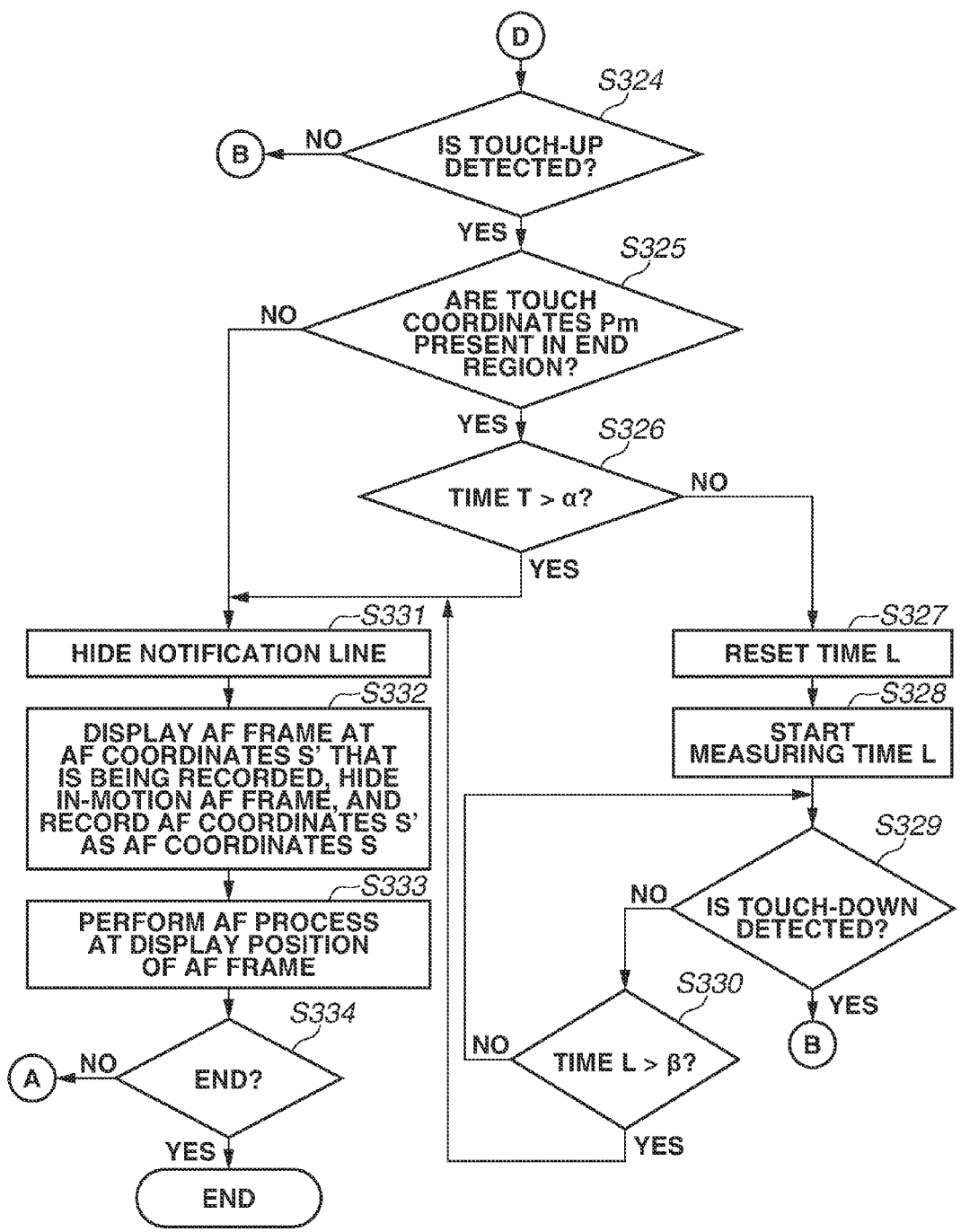

With reference to FIGS. 3A to 3C, an AF position movement processing according to the present exemplary embodiment is described. The processing is implemented by the system control unit 50 loading a program recorded in the non-volatile memory 56 into the system memory 52 and executing the program. The processing is started when the digital camera 100 is turned on, and the operation mode is switched to the image capturing mode. In the present exemplary embodiment, a touch operation of the user is received according to relative coordinates on the assumption that the user performs an operation on the touch panel 70a in the state of looking into the in-viewfinder display unit 76 (an eye approaching state). The present exemplary embodiment is not limiting. In a different exemplary embodiment, a touch operation of the user is received according to absolute coordinates, and in another exemplary embodiment, the user performs an operation on the touch panel 70a while viewing a display unit other than the display unit 28. AF coordinates and the position where an AF frame is displayed that are described in the present exemplary embodiment indicate, in the range of a captured image, the position where a subject to be subjected to an AF process is present. The AF process is performed to focus on the subject present at the set position.

Figure 5A:
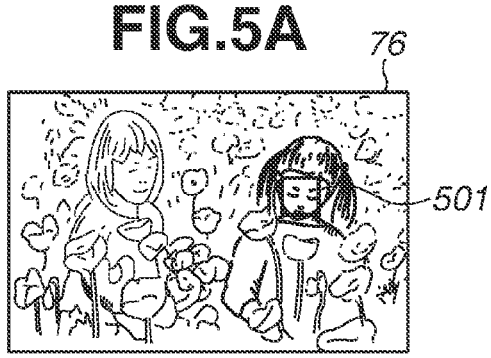
FIGS. 5A, 5B, 5C, 5D, 5E, 5F, 5G, and 5H are diagrams illustrating examples of an AF frame and an in-motion AF frame according to the exemplary embodiment.

In step S301, the system control unit 50 resets AF coordinates S from coordinates previously set by the user and records the reset AF coordinates S in the system memory 52. The system control unit 50 displays an AF frame 501 at the reset AF coordinates S on the in-viewfinder display unit 76 as in FIG. 5A. The reset coordinates are the coordinates of the center of a captured image or the coordinates where a detected face is present as in FIG. 5A. FIGS. 5A to 5H illustrate examples of display of an AF frame and an in-motion AF frame on the in-viewfinder display unit 76. FIG. 5A illustrates an example of display of the AF frame 501. In step S301, an AF process can be performed at the position where the AF frame 501 is displayed. Alternatively, the AF process can be performed at the timing of an image capturing instruction described below. At this time, the AF coordinates S are those of a position set as the position where the AF process is actually performed.

In step S302, the system control unit 50 determines whether a touch-down is performed on the touch panel 70a (a touch detection surface). If it is determined that a touch-down is performed (YES in step S302), the processing proceeds to step S306. If not (NO in step S302), the processing proceeds to step S303.

In step S303, the system control unit 50 determines whether an image capturing instruction is given by pressing the shutter button 61. If it is determined that an image capturing instruction is given (YES in step S303), the processing proceeds to step S304. If not (NO in step S303), the processing returns to step S302.

In step S304, the system control unit 50 performs the AF process at the currently recorded AF coordinates S. The AF process can be started according to the fact that an instruction is given using the first shutter switch signal SW1 (the shutter button 61 is half-pressed). In a case where the AF process is performed according to the first shutter switch signal SW1, it is possible to confirm on the in-viewfinder display unit 76 the result of the AF process based on the first shutter switch signal SW1 without giving an instruction using the second shutter switch signal SW2 and capturing an image (without recording an image).

In step S305, the system control unit 50 performs an image capturing process. That is, the system control unit 50 records in the recording medium 200 an image captured by the image capture unit 22 and subjected to the AF process in step S304. At this time, in the case of a still image, an image subjected to the AF process performed at the position of the AF coordinates S is recorded. In the case of a moving image, the capturing of an image is started in the state where the AF process is performed at the position of the AF coordinates S, but the AF position can be moved in the middle of the capturing.

Figure 5B:
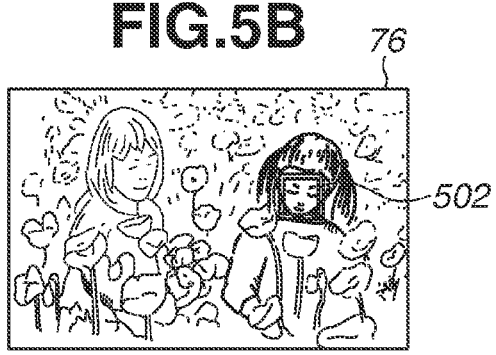

In step S306, the system control unit 50 displays an in-motion AF frame 502 at the AF coordinates S on the in-viewfinder display unit 76 and hides the AF frame 501. FIG. 5B illustrates an example of display of the in-viewfinder display unit 76 when a touch-down is detected. As illustrated in FIG. 5B, the system control unit 50 displays the in-motion AF frame 502 at the AF coordinates S and hides the AF frame 501 in FIG. 5A that has been displayed before the touch-down is detected. Alternatively, the system control unit 50 changes the display form of the AF frame 501 to obtain the in-motion AF frame 502. The system control unit 50 records as AF coordinates Sn the AF coordinates S when the touch-down is detected.

Figure 4A:
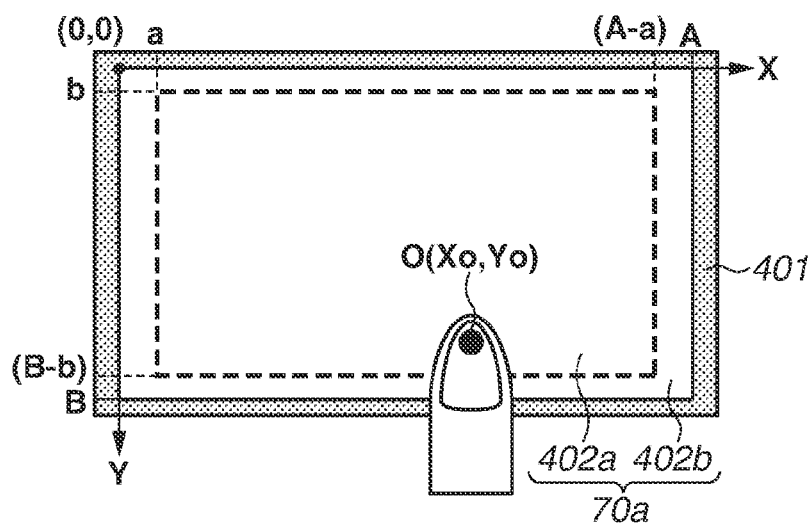
FIGS. 4A, 4B, and 4C are diagrams illustrating a state where an AF position is moved on a touch panel.
Figure 4B:
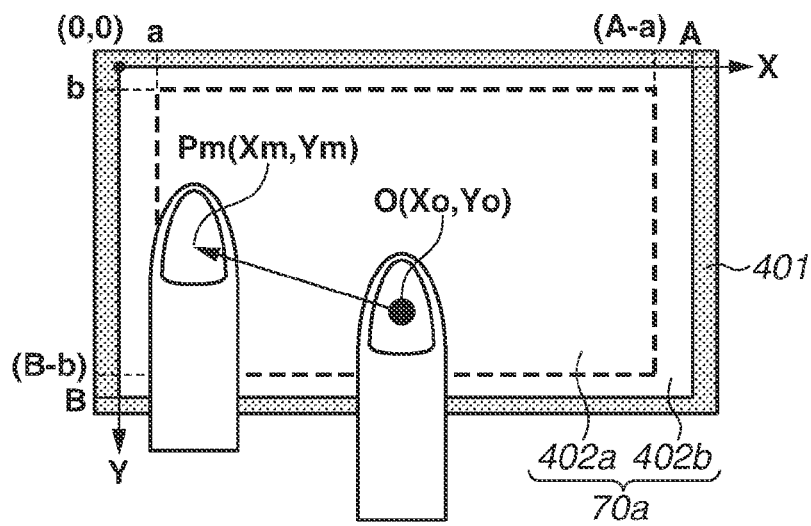
Figure 4C:
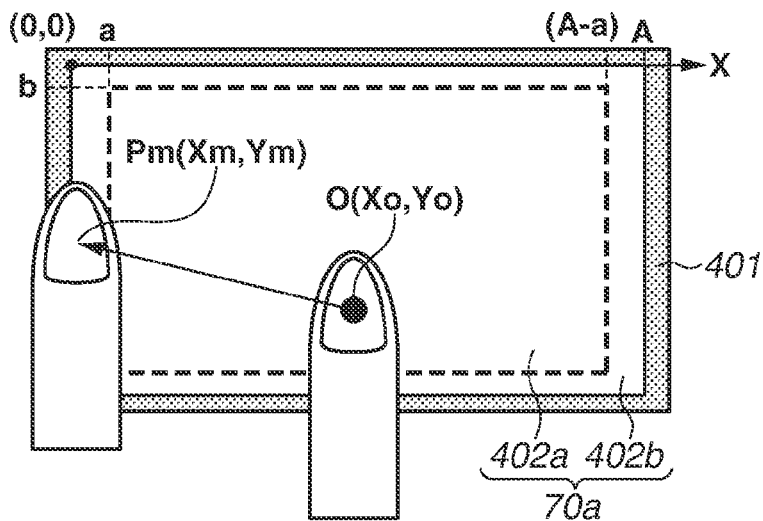

In step S307, the system control unit 50 records, as touch coordinates Pm-1 in the system memory 52, the coordinates (touch coordinates O (Xo, Yo)) of the touch-down on the touch panel 70a detected in step S302 or touch coordinates Pm detected in the most recent step S311. As illustrated in FIG. 4A, the coordinates where the touch-down is detected or the coordinates Pm where a touch is performed before a touch move are set as the touch coordinates Pm-1 (Xm-1, Ym-1). In the coordinate system of the touch panel 70a, as illustrated in FIG. 4A, an X-axis is provided in a horizontal direction, a Y-axis is provided in a vertical direction, and the origin is provided at the upper-left corner. FIGS. 4A to 4C are diagrams illustrating the state where the user performs an operation on the touch panel 70a. In FIGS. 4A to 4C, an outer frame 401 does not receive a touch operation. The outer frame 401, however, is a region covered by the same surface film as that of the touch panel 70a and is provided to surround the periphery of the touch panel 70a. There are no undulations (protrusions and recesses) between the outer frame 401 and the region of the touch panel 70a (a touchable range) so that the user can perform a touch operation with the user's finger as far as an end region of the touch panel 70a. The touchable range ($0 \leq X \leq A$, $0 \leq Y \leq B$) is divided into an end region 402b, which is a region within a predetermined distance from each side of the touch panel 70a, and a region 402a, which is not included in the end region 402b (other than the end region 402b). The end region 402b is a region where, if a touch move is performed a little further in the direction of the end, the touch comes out of the touchable range (to the outer frame 401). The region 402a is a region surrounded by the end region 402b. Although the range of the end region 402b will be described below, the end region 402b is thus provided, whereby, while a touch move is being performed on the touch panel 70a, the touch does not move to the outer frame 401 side without passing through the end region 402b.

In step S308, the system control unit 50 determines whether a touch move for moving the position where the touch panel 70a is touched is detected. If it is determined that a touch move is detected (YES in step S308), the processing proceeds to step S309. If not (NO in step S308), the processing proceeds to step S324. In step S308, a touch move can be detected according to the fact that the touch position of the user moves by 5 millimeter or 1 centimeter or more, for example. This is to avoid the situation where, if the user does not move the touch position, but the finger of the user slightly moves, this movement is determined as a touch move. If a touch operation is detected at a plurality of positions, the touch position where the touch move is detected can be used in the following processing, and the touch position of a touch operation for not moving the touch position is not used.

In step S309, the system control unit 50 resets a time T and records the reset time T in the system memory 52. In a case where the time T is not measured, this process is not performed. The time T is a time for, when a touch-up is performed in the end region 402b of the touch panel 70a, determining whether the touch-up is performed after the touch moves immediately before the touch-up, or the touch-up is performed after the continuation of the state where the touch position stops for a predetermined time or more. That is, it is determined whether, while performing the touch move, the user performs the touch move as far as the outer frame 401 side without being aware that the user is touching (passing through) the end region 402b, and then, this movement results in being determined as a touch-up (step S326 described below). The time T is measured, thereby performing the following processing. In a case where, while the user is performing the touch move, the touch moves to the outer frame 401 of the touch panel 70a without the user's intention, the movement of the AF position can be invalidated as a touch-up unintended by the user. In a case where, after the touch remains in the upper end region 402b for a predetermined time or more, the user performs a touch-up, the movement of the AF position is validated on the assumption that the user carefully performs the operation.

In step S310, the system control unit 50 starts measuring the time T reset in step S309, using the system timer 53.

In step S311, the system control unit 50 acquires the touch coordinates Pm of a point currently touched on the touch panel 70a (a touch point) and records the acquired touch coordinates Pm in the system memory 52. As illustrated in FIG. 4B, a point currently touched after the touch moves (the user performs a touch move) from the touch coordinates O has touch coordinates Pm (Xm, Ym).

In step S312, the system control unit 50 calculates relative coordinates C (Xc, Yc) from the touch coordinates Pm−1 recorded in the system memory 52 in step S307 and the touch coordinates Pm acquired in step S311. The relative coordinates C are coordinates indicating the amount of movement of a touch operation by the touch move and obtained by subtracting the touch coordinates Pm−1 from the touch coordinates Pm. That is, the relative coordinates C are represented by (Xc, Yc)=((Xm−(Xm−1)), (Ym−(Ym−1))).

In step S313, the system control unit 50 updates AF coordinates S' and records the updated AF coordinates S' in the system memory 52. The AF coordinates S' are coordinates obtained by adding the relative coordinates C calculated in step S312 to AF coordinates S' recorded in the most recent step S313. The newly obtained AF coordinates S' are represented by (Xss', Yss')=((Xs'+Xc), (Ys'+Yc)). The obtained AF coordinates S' (Xss', Yss') are newly updated as AF coordinates S' (Xs', Ys'). In a case where the process of step S313 has not been performed once since the process of step S301, the AF coordinates S' are obtained by adding the relative coordinates C to the AF coordinates S set in step S301. Unlike the AF coordinates S, the AF coordinates S' do not indicate the position where the AF process is actually performed, but indicate coordinates in motion as a candidate for coordinates to be set as the AF coordinates S.

Figure 5C:
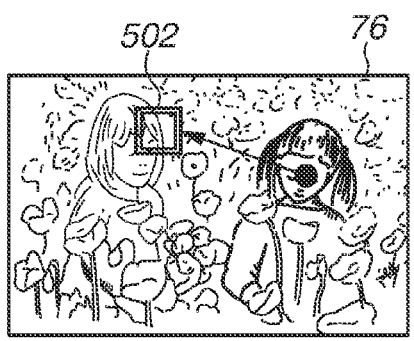

In step S314, the system control unit 50 displays the in-motion AF frame 502 on the in-viewfinder display unit 76 at the position of the AF coordinates S' recorded in step S313. FIG. 5C illustrates an example where the in-motion AF frame 502 is displayed at the updated AF coordinates S'. FIG. 5C illustrates the in-motion AF frame 502 moved according to the touch move operation in FIG. 4B. An arrow illustrated in FIG. 5C indicates the process of the movement of the in-motion AF frame 502 in an easily understandable manner, but is not actually displayed on the in-viewfinder display unit 76. In step S314, as illustrated in FIG. 5C, the in-motion AF frame 502 is displayed at the position to which the touch moves from the previous AF coordinates S' in the direction of the touch move by the length of movement of the touch move.

The processes of steps S315 to S323 are processes for displaying a notification line (a guide) for warning the user not to unintentionally perform the touch move as far as the outer frame 401 from the touchable range (0≤X≤A, 0≤Y≤B) where the touch panel 70a can receive a touch operation. Even if the user does not release the user's finger from the screen, if the touch moves out of the touchable range, it is determined that a touch-up is performed on the touch panel 70a. Since the user is performing a touch operation while looking into the in-viewfinder display unit 76, it is difficult for the user to recognize the touch position on the touch panel 70a. However, a warning that the touch point is approaching the edge of the touch panel 70a is displayed on the in-viewfinder display unit 76, thereby enabling the user to recognize the touch position. The determination of whether the touch point is included in the end region 402b is made based on whether the touch coordinates Pm on the touch panel 70a satisfy any of 0≤Xm≤a, (A−a)≤Xm≤A, 0≤Ym≤b, and (B−b)≤Ym≤B. In steps S316, S318, S320, and S322, it is determined which side (edge) the touch point is approaching.

In step S315, the system control unit 50 hides a notification line displayed on the in-viewfinder display unit 76. If a notification line is not displayed, this process is not performed.

In step S316, the system control unit 50 determines whether the X-coordinate of the touch coordinates Pm on the touch panel 70a recorded in step S311 satisfies 0≤Xm≤a. At this time, a can be set to the following distance. That is, based on the distance, it is highly likely that if the user continues the touch move, the touch point will come out of the touchable range (the touch panel 70a). In this case, the distance is 0.5 centimeters or 1 centimeter, for example. That is, the system control unit 50 determines whether the touch point approaches the left side of the touch panel 70a (enters a portion having a width of a on the left side). If it is determined that the X-coordinate of the touch coordinates Pm satisfies 0≤Xm≤a (YES in step S316), the processing proceeds to step S317. If not (NO in step S316), the processing proceeds to step S318.

Figure 5D:
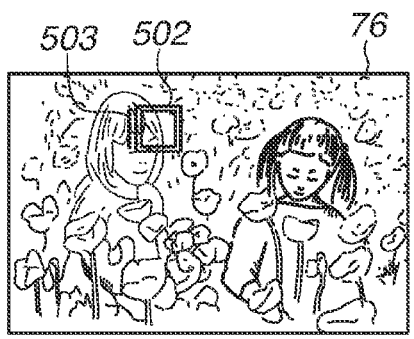

In step S317, the system control unit 50 displays a notification line along the left side of the in-motion AF frame 502 on the in-viewfinder display unit 76. FIG. 5D illustrates an example of display of the in-viewfinder display unit 76 in a case where the determination is YES in step S316. In step S317, the system control unit 50 displays a notification line 503 along the left side of the in-motion AF frame 502 as in FIG. 5D.

In step S318, the system control unit 50 determines whether the X-coordinate of the touch coordinates Pm recorded in step S311 satisfies (A−a)≤Xm≤A. That is, the system control unit 50 determines whether the touch point approaches the right side of the touch panel 70a (enters a portion having a width of a on the right side). If it is determined that the X-coordinate of the touch coordinates Pm satisfies (A−a)≤Xm≤A (YES in step S318), the processing proceeds to step S319. If not (NO in step S318), the processing proceeds to step S320.

Figure 5E:
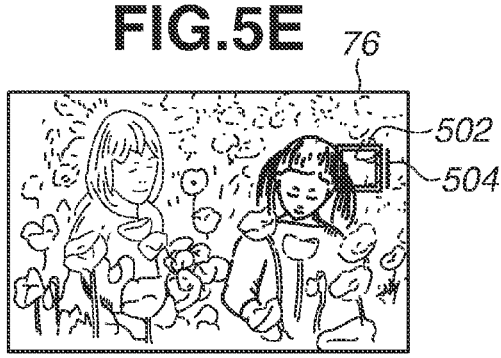

In step S319, the system control unit 50 displays a notification line along the right side of the in-motion AF frame 502 displayed on the in-viewfinder display unit 76. FIG. 5E illustrates an example of display of the in-viewfinder display unit 76 in a case where the determination is YES in step S318. In step S319, the system control unit 50 displays a notification line 504 along the right side of the in-motion AF frame 502 as in FIG. 5E.

In step S320, the system control unit 50 determines whether the Y-coordinate of the touch coordinates Pm on the touch panel 70a recorded in step S311 satisfies 0≤Ym≤b. At this time, b is set to the following distance. That is, based on the distance, it is highly likely that if the user continues the touch move, the touch point will come out of the touchable range of the touch panel 70a. In this case, the distance is 0.5 centimeters or 1 centimeter, for example. That is, the system control unit 50 determines whether the touch point approaches the upper side of the touch panel 70a (enters a portion having a width of b on the upper side). If it is determined that the Y-coordinate of the touch coordinates Pm satisfies 0≤Ym≤b (YES in step S320), the processing proceeds to step S321. If not (NO in step S320), the processing proceeds to step S322.

Figure 5F:

In step S321, the system control unit 50 displays a notification line along the upper side of the in-motion AF frame 502 displayed on the in-viewfinder display unit 76. FIG. 5F illustrates an example of display of the in-viewfinder display unit 76 in a case where the determination is YES in step S320. In step S321, the system control unit 50 displays a notification line 505 along the upper side of the in-motion AF frame 502 as in FIG. 5F.

In step S322, the system control unit 50 determines whether the Y-coordinate of the touch coordinates Pm on the touch panel 70a recorded in step S311 satisfies (B−b)≤Ym≤B. That is, the system control unit 50 determines whether the touch point approaches the lower side of the touch panel 70a (enters a portion having a width of b on the lower side). If it is determined that the Y-coordinate of the touch coordinates Pm satisfies (B−b)≤Ym≤B (YES in step S322), the processing proceeds to step S323. If not (NO in step S322), the processing proceeds to step S324.

Figure 5G:
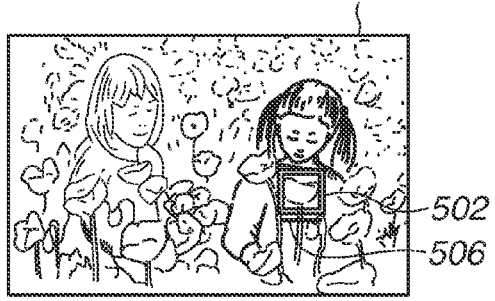

In step S323, the system control unit 50 displays a notification line along the lower side of the in-motion AF frame 502 displayed on the in-viewfinder display unit 76. FIG. 5G illustrates an example of display of the in-viewfinder display unit 76 in a case where the determination is YES in step S322. In step S323, the system control unit 50 displays a notification line 506 along the lower side of the in-motion AF frame 502 as in FIG. 5G.

In step S324, the system control unit 50 determines whether a touch-up is detected on the touch panel 70a. If it is determined that a touch-up is detected (YES in step S324), the processing proceeds to step S325. If not (NO in step S324), the processing returns to step S308. In step S308, the system control unit 50 waits until a touch move is detected.

In step S325, the system control unit 50 determines whether the touch coordinates Pm on the touch panel 70a recorded in the most recent step S311 are present in the end region 402b. The determination of whether the touch coordinates Pm are included in the end region 402b is made based on whether the touch coordinates Pm on the touch panel 70a satisfy any of 0≤Xm≤a, (A−a)≤Xm≤A, 0≤Ym≤b, and (B−b)≤Ym≤B as illustrated in steps S315 to S323. If it is determined that the touch coordinates Pm are present in the end region 402b (YES in step S325), the processing proceeds to step S326. If not (NO in step S325), the processing proceeds to step S331.

In step S326, the system control unit 50 determines whether as the time T of which the measurement has been started in step S310, a predetermined time α or more elapses (the time T is within the predetermined time α). The predetermined time α is 1.5 seconds or 2 seconds, for example. That is, the system control unit 50 determines whether the user touches the end region 402b for the predetermined time α or more and then performs the touch-up (touches the end region 402b for a long time and then performs the touch-up), or the user touches the end region 402b for less than the predetermined time α and then performs the touch-up. If the predetermined time α or more elapses in the state where the user touches the end, and then, the user performs the touch-up, it is possible to presume that the user intentionally indicates AF coordinates even in the end region 402b. If, on the other hand, the user performs the touch-up in less than the predetermined time α (in a short time) after touching the end region 402b, it is possible to presume that the user unintentionally performs the touch-up in the end region 402b of the touch panel 70a during the touch move. That is, it is possible to presume that the touch position comes out of the touch panel 70a without the user being aware of the coming out of the touch position. If it is determined that as the time T, the predetermined time α or more elapses (YES in step S326), the processing proceeds to step S331. If not (NO in step S326), the processing proceeds to step S327.

In step S327, the system control unit 50 resets a time L and records the reset time L in the system memory 52. If the time L is not measured, this process is not performed. The time L is a time for, in a case where the user touches the end region 402b of the touch panel 70a only for less than the predetermined time α (because the touch comes out of the touchable range during the touch move) and performs the touch-up, waiting for an instruction from the user again. In other words, even if the determination is NO in step S326, but if the user accepts the position of the current AF coordinates S' without performing an operation, the system control unit 50 finalizes the current AF coordinates S' as the AF coordinates S (performs the AF process) after a predetermined time elapses. In more other words, this is the state where the system control unit 50 determines that a touch-up unintended by the user is performed in step S326, and therefore does not finalize the AF coordinates S'. Thus, in step S329, if a touch operation of the user is detected by the time when the predetermined time elapses, the system control unit 50 can continue to move the AF coordinates S' without executing the AF process.

In step S328, the system control unit 50 starts measuring the time L reset in step S327, using the system timer 53.

In step S329, the system control unit 50 determines whether a touch-down on the touch panel 70a is detected. If it is determined that a touch-down is detected (YES in step S329), the processing proceeds to step S308. If not (NO in step S329), the processing proceeds to step S330.

In step S330, the system control unit 50 determines whether as the time L of which the measurement has been started in step S328, a predetermined time β or more elapses. The predetermined time β is 2 seconds or 3 seconds, for example. If it is determined that the predetermined time β or more elapses (YES in step S330), the processing proceeds to step S331. If not (NO in step S330), then in step S329, the system control unit 50 waits until a touch-down is detected.

In step S331, the system control unit 50 hides any of the notification lines 503 to 506 displayed in steps S317, S319, S321, and S323 from the in-viewfinder display unit 76. If a notification line is not displayed, this process is not performed.

Figure 5H:
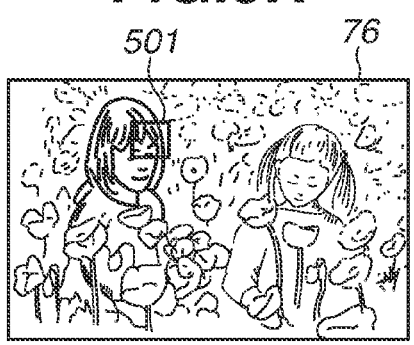

In step S332, the system control unit 50 records, as the AF coordinates S in the system memory 52, the AF coordinates S' that are being recorded in the in-viewfinder display unit 76. Then, the system control unit 50 displays the AF frame 501 at the recorded AF coordinates S'. The system control unit 50 hides the in-motion AF frame 502 (or changes the display form of the in-motion AF frame 502 to obtain the AF frame 501). That is, the AF coordinates S' that are being recorded are set as the position where the AF process is performed (the AF coordinates S). At this time, the AF coordinates Sn recorded in step S306 are deleted. FIG. 5H illustrates an example of display of the AF frame 501 in a case where the AF coordinates S are finalized in the state of FIG. 5D. FIG. 5H illustrates the state where the AF coordinates S are finalized by changing display indicating an AF frame from the in-motion AF frame 502 to the AF frame 501 at the same coordinates. That is, FIG. 5H illustrates the state where in a case where the in-motion AF frame 502 is displayed, the position where the AF process is actually performed (being performed) is the position before the operation of moving the AF position, but if the display is switched to the AF frame 501, the AF process is performed at the position where the AF frame 501 is displayed. In a case where the processing proceeds to step S332 after the determination is YES in step S330, the AF coordinates cannot be changed from the AF coordinates Sn recorded in step S306. As described above, if the AF coordinates are changed back to those before the touch move, and even if the user does not perform a touch operation in the predetermined time β after the touch slides out of the end region 402*b*, it is possible to prevent the AF position from being changed to a position unintended by the user.

In step S333, the system control unit 50 performs the AF process at the AF coordinates S that are being recorded (that are being set and have been finalized in step S332) (the display position of the AF frame 501). In a case where the AF process has already been performed before the movement of the AF position, the position where the AF process is performed in step S333 changes. In other words, the position where a subject comes into focus changes. In FIG. 5H, a person on the left side is in focus, and the position where a subject comes into focus changes from the state of FIG. 5A, where a person on the right side is in focus. The AF process, however, may not necessarily be performed in step S333, and can be performed at the AF coordinates S that are being recorded according to an image capturing instruction.

In step S334, the system control unit 50 determines whether an instruction to end the AF position movement processing is given. Examples of the instruction to end the AF position movement processing include the turning off of the digital camera 100 and switching to a power saving mode (to which the digital camera 100 transitions if a no-operation state continues for a certain time or more). If it is determined that an instruction to end the AF position movement processing is given (YES in step S334), the AF position movement processing ends. If not (NO step S334), the processing returns to step S302.

According to the above exemplary embodiment, it is possible to reduce the possibility that in a case where the user moves the AF position on the touch panel 70*a* while looking into the in-viewfinder display unit 76, the touch position comes out of the touch panel 70*a* without the user's intention, whereby the AF position results in an unintended position. That is, it is possible to reduce the possibility that in the state where the user looks into the in-viewfinder display unit 76 (in the state where the touch panel 70*a* is not viewable by the user), the AF position that is moving results in an unintended position. Even if a touch-up is detected in the end region 402*b*, but if the user touches the end region 402*b* for the predetermined time α or more, the AF position is moved on the assumption that the touch does not come out of the touchable range without the user's intention during a touch move. Thus, it is also possible to prevent the operability for the user from being reduced. If the user unintentionally performs a touch-up in the end region 402*b*, the touch position is not immediately finalized. Then, the movement of the AF position is not finalized by the time when the predetermined time β elapses. Then, the system control unit 50 waits for a touch operation of the user. Thus, the user can perform a touch operation again.

In a variation, the configuration of the digital camera 100 is similar to that in FIGS. 1A, 1B, and 2 in the exemplary embodiment. The state of a touch on the touch panel 70*a* is also similar to that in FIGS. 4A to 4C. The variation, however, is different from the exemplary embodiment in a part of the AF position movement processing in FIGS. 3A to 3C, and the method for displaying AF frames on the in-viewfinder display unit 76. With reference to FIGS. 6A to 6D, the display forms of AF frames in the variation of the exemplary embodiment are described. In the variation, unlike the exemplary embodiment, during the movement of the touch position, not only is the in-motion AF frame 502 displayed, but also the AF frame 501 remains displayed at the position before the movement of the AF position. In the exemplary embodiment, an example has been described where, if it is determined that the touch position comes out of the touch panel 70*a* without the user's intention, the operation of performing a movement operation again within the predetermined time M) is received. Then, if the predetermined time elapses, the AF position is changed. In the variation, if it is determined that the touch position comes out of the touch panel 70*a* without the user's intention, the AF process is not executed, regardless of the predetermined time.

With reference to FIGS. 3A to 3C, particularly, processes in the variation that are different from the exemplary embodiment are described. This processing is achieved by loading a program recorded in the non-volatile memory 56 into the system memory 52 and by the system control unit 50 executing the program. This processing is started when the digital camera 100 is turned on, and the operation mode is switched to the image capturing mode.

Figure 6A:
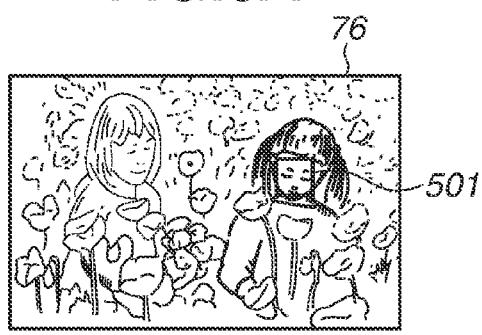
FIGS. 6A, 6B, 6C, and 6D are diagrams illustrating examples of an AF frame and an in-motion AF frame according to a variation of the exemplary embodiment.

The process of step S301 in the variation is similar to that in the exemplary embodiment. FIG. 6A illustrates an example of display of the in-viewfinder display unit 76 in step S301 in the variation. In FIG. 6A, an AF frame 501 is displayed.

The processes of steps S302 to S305 in the variation are similar to those in the exemplary embodiment.

Figure 6B:
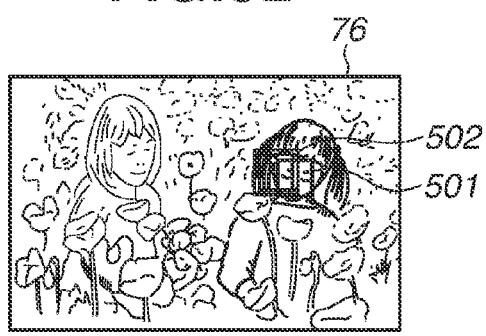

In step S306 in the variation, unlike step S306 in the exemplary embodiment, as illustrated in FIG. 6B, the system control unit 50 displays an in-motion AF frame 502 and keeps the AF frame 501 displayed without hiding the AF frame 501. As described above, even during the movement of the AF position, the AF frame 501 is displayed at the position recorded as the AF coordinates Sn, thereby enabling the user to understand the position where the AF process is performed (being performed).

The processes of steps S307 to S313 in the variation are similar to those in the exemplary embodiment.

Figure 6C:
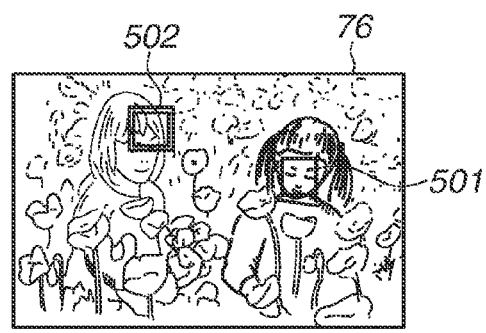

In step S314 in the variation, as illustrated in FIG. 6C, the system control unit 50 displays the in-motion AF frame 502 at the obtained AF coordinates S'. Unlike step S314 in the exemplary embodiment, since the system control unit 50 keeps the AF frame 501 displayed in step S306 in the variation, the position that is currently set (the AF frame 501) and the position that is currently being changed (the in-motion AF frame 502) are displayed. Thus, the user can perform the operation of changing the position while comparing the current position with the position to be changed from now.

The processes of steps S315 to S326 in the variation are similar to those in the exemplary embodiment.

In the variation, however, if the determination is NO in step S326, the processes of steps S327 to S330 are not performed, and the processing proceeds to step S302. That is, if the determination is NO in step S326, for example, in the state where the in-motion AF frame 502 illustrated in FIG. 6C is displayed, and even if a touch-up is detected, the AF coordinates S' that are currently moving are not set as the AF coordinates S. Until the user performs a touch-down on the touch panel 70*a* again, and the determination is NO in step S325, or the determination is YES in step S326, the AF coordinates S are not changed from the AF coordinates S before being touched (the AF coordinates Sn recorded in the most recent step S306).

The process of step S331 in the variation is similar to that in the exemplary embodiment.

Figure 6D:
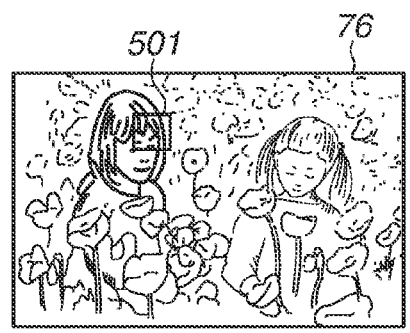

In step S332 in the variation, the AF frame displayed at the AF coordinates S' that are being recorded changes from the display form of the in-motion AF frame 502 illustrated in FIG. 6C to the display form of the AF frame 501 illustrated in FIG. 6D. At this time, the AF frame 501 displayed at the previous AF coordinates S (the coordinates recorded as the AF coordinates Sn) is hidden.

According to the above exemplary embodiment, in a case where the AF coordinates S are to be set by performing a move on the touch panel 70*a*, and even if the touch position comes out of the region of the touch panel 70*a* without the user's intention, the AF coordinates S are less likely to be set at a position unintended by the user. In a case where the touch position does not come out of the region of the touch panel 70*a*, but the user intentionally releases the touch, the AF coordinates S are set (changed) according to the position of the touch-up. That is, the AF coordinates S are set according to the touch-up intentionally performed by the user. In a case where the touch slides out of (released from) the region of the touch panel 70*a* without the user's intention, the AF coordinates are not set. Thus, the AF coordinates are set at a position more according to the intention of the user.

In a case where the touch position of the user on the touch panel 70*a* enters the end region 402*b*, a notification line is displayed along the in-motion AF frame 502. Thus, the user can understand that if the user continues the touch move, the touch point will come out of the touch panel 70*a*. The notification line indicates which end region of the touch panel 70*a* the touch point is approaching. Thus, according to the position of the notification line, the user can adjust the position where the touch move is performed.

The notification line is a line displayed adjacent to the in-motion AF frame 502. Alternatively, the contrast of the in-motion AF frame 502 can be changed, or a warning can be displayed in characters. Alternatively, an arrow can indicate the direction in which, if the touch advances further, the touch point will come out of the touch panel 70*a*.

The predetermined times α and β described in the present exemplary embodiment can be changed according to whether a moving image is photographed or a still image is photographed. The predetermined time α is a time for determining whether a touch-up in the end region is intended by the user. Thus, in the case of the capturing of a moving image, the predetermined time α can be made longer than in the case of the capturing of a still image, thereby determining more certainly whether a touch-up is intentionally performed by the user. During the recording of a moving image, if the AF position is finalized at an unintended position, an unintended image can be recorded. Thus, the predetermined time α is set to be long, thereby enabling a more accurate determination. In the case of a still image, even if the AF position is finalized at an unintended position, the user only needs to avoid giving an image capturing instruction. Thus, to improve the operability for the user, the predetermined time α can be made shorter than in the case of a moving image. The predetermined time β is a time for, in a case where a touch-up is performed in the end region of the touch panel 70*a*, finalizing the AF position at the position of the touch-up. Thus, in the case of the capturing of a moving image, the AF position can be made longer than in the case of the capturing of a still image. As described above, during the recording of a moving image, if the AF position is finalized at an unintended AF position, an unintended image can be recorded. Thus, the time for allowing the user to readjust the AF position is set to be long. At this time, if the AF position is changed at the timing when the predetermined time β elapses, there is a possibility that the AF process is performed at timing unintended by the user. As described above in the present exemplary embodiment, however, the user can move the AF position at desired timing by touching the touch panel 70*a* again and performing a touch-up at desired timing. In the case of the capturing of a still image, if a touch-up in the end region is determined as being unintended by the user, but is intentionally performed by the user, a quick movement of the AF position (YES in step S330) reduces the possibility that the user waits for a change in the AF position and misses a photo opportunity.

During the capturing of a moving image, even if a touch-up is performed in the region that is not the end region, the AF coordinates cannot be changed. In the case of a still image or in the state of waiting for the capturing of an image, if a touch-up is performed in the region that is not the end region, the AF coordinates can be changed according to the touch-up. At this time, during the photographed of a moving image, changes in the AF coordinates can be determined by a determination operation such as a tap operation or a double-tap operation. If the AF coordinates are thus changed according to a determination operation during the capturing of a moving image, the user can set the AF process to be performed at desired timing after confirming the changed AF coordinates.

During the capturing of a moving image, the AF coordinates can be set according to a touch-up in the region that is not the end region, and the AF coordinates cannot be set according to a touch-up in the end region. In the case of a still image, even if a touch operation is determined as a touch-up in the end region, the AF coordinates can be set. During the capturing of a moving image, if the AF position is changed without the user's intention, an image subjected to AF can be recorded at a position unintended by the user. Thus, even if the touch comes out of the end region without the user's intention, the AF coordinates are not changed. In the case of a still image, even if the AF process is performed at an unintended position, the image is not being recorded. Thus, the user can set the AF coordinates again before the image is recorded.

In the range of the end region 402*b*, the upper, lower, left, and right regions along the respective sides of the touch panel 70*a* can be set as follows. In the present exemplary embodiment, an example has been described where the left and right regions are regions along sides within a distance of a from the respective (left and right) sides, and the upper and lower regions are regions along sides within a distance of b from the respective (upper and lower) sides. Alternatively, for example, the regions along the left side and the right side can be of different sizes. In a case where a shutter button and a grip portion (a holding portion) are located to the right of the touch panel 70*a* (as viewed from the user observing a subject), it is easy to perform a touch move toward the right side (in the right direction) or the lower side (the down direction) of the touch panel 70*a*. Thus, there is a possibility that the user swiftly performs a touch move. If the user swiftly performs a touch move, it is highly likely that the touch position enters the end region 402*b* and then immediately comes out of the touch panel 70*a*. In response, to make the user aware earlier that the touch is approaching the end, the end region 402*b* includes a range having a distance longer than a from the right side (a range having a distance longer than b from the lower side), thereby displaying a notification line earlier. As described above, in a region where it is easier for the user to perform a touch move, the width of the region included in the end region 402*b* is increased, thereby reducing the possibility that the touch position comes out of the touch panel 70*a* without the user's intention. In this case, the range of the end region 402*b* is $0 \leq Xm \leq a$, $(A-aa\ (>a)) \leq Xm \leq A$, $0 \leq Ym \leq b$, and $(B-bb\ (>b)) \leq Ym \leq B$.

The present exemplary embodiment is effective also in a case where the user unintentionally performs a touch-up during a touch move, as well as a case where the user unintentionally performs a touch-up in the end region of the touch panel 70*a* during a touch move (even in a case where the user unintentionally performs a touch-up in the region other than the end the region). In a case where, if the user performs a touch move in the state where the finger of the user touching the touch panel 70*a* does not sufficiently reach the touch panel 70*a*, the finger separates from the touch panel 70*a* in the middle of the touch move, the AF process may not be immediately executed. For example, in the case of a touch move toward the upper side (in the up direction) or the left side (the left direction) (in a direction opposite to the direction in which it is easy to perform a touch move), the user performs the operation of grazing the touch panel 70*a* lightly with the user's finger before performing a touch move by a distance by which the user has attempted to move. Thus, it is highly likely that the user will perform a touch-up. Thus, if the width of the region included in the end region 402*b* is increased in the region along the upper side or the region along the left side, and even if the user unintentionally performs a touch-up during a touch move in the up direction or the left direction, the possibility that a process is immediately executed is reduced.

Alternatively, based on the direction of a touch move, it can be determined whether to immediately execute a process according to a touch-up. More specifically, in a case where the user performs a touch move in the up direction or the left direction and then performs a touch-up without stopping the touch move (T a), the processing can proceed to step S327, regardless of the touch position. Then, the AF coordinates may not be immediately set (and the AF process may not be immediately processed). On the other hand, in a case where the user performs a touch move in the down direction or the right direction and then performs a touch-up without stopping the touch move (T a), and if the touch position when the touch-up is performed is the right end $((A-a) \leq Xm \leq A)$ or the lower end $((B-b) \leq Ym \leq B)$, the processing proceeds to step S327. If not (in a case where the user performs a touch-up while performing a touch move in the direction in which it is difficult to perform a touch move), the processing proceeds to step S331. Then, the settings of the AF coordinates (and the AF process at the position of the set AF coordinates) can be immediately started.

In a case where the user is not looking into the in-viewfinder display unit 76, display can be performed on the touch panel 70*a* (the display unit 28), and an operation on the touch panel 70*a* can be received according to absolute coordinates. In a case where the user is looking into the in-viewfinder display unit 76, an operation on the touch panel 70*a* can be received according to relative coordinates. In a case where the user is not looking into the in-viewfinder display unit 76, a captured image or an AF frame can be displayed on the touch panel 70*a*. At this time, in a case where the user is viewing the display unit 28 without looking into the in-viewfinder display unit 76, the position of the AF coordinates is changed (set) according to a touch-up, regardless of the touch-up position (even in the end region).

In the above exemplary embodiment, in a case where a touch-up is performed in the end region 402*b*, the predetermined time T is measured to determine whether a touch move is performed immediately before the touch-up, or the user intentionally performs the touch-up. Alternatively, the determination can be made based on the position of the touch-up. That is, in a case where a touch-up is detected within a predetermined distance (e.g., within 2 millimeters) from the outer frame 401, it can be determined that the touch-up is performed during a touch move.

In the above exemplary embodiment, a description has been given of the operation of moving the position where an AF process is performed. Other exemplary embodiments are applicable to the setting (selection) of the position (region) where various processes are performed. For example, the selection of a face AF frame for focusing on the face of a specific person, or the selection of an enlargement position (zooming in and zooming out), or where, when a process such as an auto exposure or automatic exposure setting (AE) process or a white balance (WB) process is performed, a subject, a position, or a region is selected as a reference for performing the process. Another exemplary embodiment is applicable where a tracking target or color tracking is selected.

A description has been given on the assumption that the system control unit 50 controls the above flowcharts. Alternatively, a single piece of hardware can control the above flowcharts. Alternatively, a plurality of pieces of hardware can share processing to control the entirety of the apparatus.

In the above exemplary embodiment, an example has been described using a digital camera 100. However, any electronic device that performs control to move the position where a process based on a specified position, such as an AF process, an AE process, or an AWB process, is performed is applicable. For example, a personal computer (PC), a mobile phone terminal, a mobile image viewer, a digital photo frame, a music player, a game apparatus, an electronic book reader, a tablet PC, a smartphone, or a household electrical appliance apparatus. Apparatuses, such as a smartphone, a tablet PC, or a desktop PC, for receiving AF information of a digital camera through wired or wireless communication, displaying the AF information, and remotely controlling the digital camera (including a network camera) are also applicable.

The functions of the above-described embodiment(s) can be achieved by performing the process of supplying software (a program) to a system or an apparatus via a network or various recording media, and causing a computer (or a CPU or a microprocessor unit (MPU)) of the system or the apparatus to read and execute a program code. In this case, the program and a recording medium having stored thereon the program constitute aspects of the present invention.

According to the embodiments, it is possible to reduce the possibility that while a user is moving a specified position regarding a specific process to be performed based on the specified position, the specific process is performed at a position unintended by the user.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-234300, filed Nov. 30, 2015, which is hereby incorporated by reference herein in its entirety.

What is claimed is:

1. An electronic device comprising:
   a touch detection unit configured to detect a touch operation on a touch detection surface having an end region, wherein the touch detection surface is outside a viewfinder;
   a selection unit configured to select a position on a display unit in the viewfinder according to a movement operation, which is an operation of moving a touch position, in a predetermined region including the end region of the touch detection surface, and to select a position on the display unit according to the movement operation in a region that is not the predetermined region; and
   a control unit configured to perform control so that a specific process based on the selected position is performed,
   wherein the control unit performs control so that:
   according to whether release of a touch after the movement operation is from the predetermined region, the specific process based on a position selected according to the movement operation is either performed or not performed;
   in a case where release of a touch from the predetermined region has been detected after a first movement operation, the specific process based on a position selected according to the first movement operation is not performed, and a position to be selected is moved from the position that is selected according to the first movement operation on the display unit according to a second movement operation without the specific operation being performed between the first movement operation and the second movement operation; and
   in a case where, subsequent to the first movement operation, release of a touch from the region that is not the predetermined region has been detected, the specific process based on the position selected according to the first movement operation is performed.

2. The electronic device according to claim 1, wherein the control unit performs control so that, based on the touch being released from the predetermined region subsequent to the first movement operation, and a predetermined time elapsing in a state where no touch operation is detected after the touch is released, the specific process based on the position selected according to the first movement operation is performed.

3. The electronic device according to claim 1, wherein the control unit performs control so that, where, subsequent to the first movement operation a touch is released from the predetermined region, the specific process based on the position selected according to the first movement operation is not performed, and the specific process based on a position selected before the first movement operation is performed is performed.

4. The electronic device according to claim 1, wherein the control unit performs control so that:
   in a case where a touch is released from the predetermined region within a predetermined time after the movement of the touch position is detected, the specific process based on the position selected according to the movement operation is not performed; and
   in a case where a touch is released from the predetermined region after the predetermined time elapses after the movement of the touch position is detected, the specific process based on the position selected according to the movement operation is performed.

5. The electronic device according to claim 1, wherein the control unit performs control so that, in a case where, while performing an operation for moving the touch position in the predetermined region, the touch position comes out of the touch detection surface, the specific process based on the position selected according to the movement operation is not performed, and in a case where, subsequent to a state where the touch position is not moved for a predetermined time in the predetermined region, the touch is released from the touch detection surface, the specific process based on the position selected according to the movement operation is performed.

6. The electronic device according to claim 1, wherein the control unit performs control so that:
   in a case where a captured moving image is being recorded, even if, subsequent to the movement operation, a touch is released from the predetermined region on the touch detection surface, the specific process based on the position selected according to the movement operation is not performed within a first time after the touch is released, and based on the first time elapsing after the touch is released, the predetermined process based on the position selected according to the movement operation is performed; and in a case where a captured moving image is not being recorded, even if, subsequent to the movement operation, a touch is released from the predetermined region on the touch detection surface, the specific process based on the position selected according to the movement operation is not performed within a second time, which is shorter than the first time, after the touch is released.

7. The electronic device according to claim 1, wherein the control unit performs control so that:

in a case where a captured moving image is being recorded, even if, subsequent to the movement operation, a touch is released from the predetermined region on the touch detection surface, the specific process based on the position selected according to the movement operation is not performed; and in a case where a captured moving image is not being recorded, if, subsequent to the movement operation, a touch is released from the predetermined region on the touch detection surface, the specific process based on the position selected according to the movement operation is performed.

8. The electronic device according to claim 1, wherein the predetermined region includes a first region including at least a first side among a plurality of sides constituting the touch detection surface, and a second region including a second side different from the first side, and wherein the control unit performs control so that, based on detection of movement of the touch position to the first region, a guide indicating a direction from the touch position to the first side is displayed, and, based on detection of movement of the touch position to the second region, a guide indicating a direction from the touch position to the second side is displayed.

9. The electronic device according to claim 1, wherein the display unit is an in-viewfinder display unit.

10. The electronic device according to claim 1, further comprising an eye approach detection unit configured to detect approach of an eye to an in-viewfinder display unit configured to enable visual confirmation of a subject through an eyepiece portion, wherein the control unit performs control so that, in a case where approach of an eye to the in-viewfinder display unit is not detected, even if a region where a touch is released subsequent to the movement operation is the predetermined region, if the touch is released, the specific process based on the position selected according to the movement operation is performed.

11. The electronic device according to claim 1, wherein the control unit further performs control so that:

input coordinates on the touch detection surface are associated with display coordinates on the display unit.

12. The electronic device according to claim 11, wherein the control unit performs control so that:

a setting for receiving an instruction by associating the position where a touch operation is performed with the position on the display unit is an absolute coordinate setting.

13. The electronic device according to claim 11, wherein the control unit performs control so that:

a setting for receiving an instruction at a position to which the touch moves from the predetermined position on the display unit is a relative coordinate setting.

14. A control method for controlling an electronic device, the control method comprising:

detecting a touch operation on a touch detection surface having an end region wherein the touch detection surface is outside a viewfinder;

selecting a position on a display unit in the viewfinder according to a movement operation, which is an operation of moving a touch position, in a predetermined region including the end region of the touch detection surface, and selecting a position on the display unit according to the movement operation in a region that is not the predetermined region; and performing control so that a specific process based on the selected position is performed, wherein control is performed so that:

according to whether release of a touch after the movement operation is from the predetermined region, the specific process based on a position selected according to the movement operation is either performed or not performed;

in a case where release of a touch from the predetermined region has been detected after a first movement operation, the specific process based on a position selected according to the first movement operation is not performed, and a position to be selected is moved from the position that is selected according to the first movement operation on the display unit according to a second movement operation without the specific operation being performed between the first movement operation and the second movement operation; and in a case where, subsequent to the first movement operation, release of a touch from the region that is not the predetermined region has been detected, the specific process based on the position selected according to the first movement operation is performed.

15. A non-transitory computer readable storage medium storing computer executable instructions for causing a computer to execute a control method for controlling an electronic device, the control method comprising:

detecting a touch operation on a touch detection surface having an end region, wherein the touch detection surface is outside a viewfinder;

selecting a position on a display unit according to a movement operation, which is an operation of moving a touch position, in a predetermined region including the end region of the touch detection surface, and to select a position on the display unit according to the movement operation in a region that is not the predetermined region; and performing control so that a specific process based on the selected position is performed, wherein control is performed so that:

according to whether release of a touch after the movement operation is from the predetermined region, the specific process based on a position selected according to the movement operation is either performed or not performed;

in a case where release of a touch from the predetermined region has been detected after a first movement operation, the specific process based on a position selected according to the first movement operation is not performed, and a position to be selected is moved from the position that is selected according to the first movement operation on the display unit according to a second movement operation without the specific operation being performed between the first movement operation and the second movement operation; and in a case where, subsequent to the first movement operation, release of a touch from the region that is not the predetermined region has been detected, the specific process based on the position selected according to the first movement operation is performed.

* * * * *